United States Patent
Immendorf et al.

(10) Patent No.: US 9,769,834 B2
(45) Date of Patent: Sep. 19, 2017

(54) INTERFERENCE DETECTION WITH UE SIGNAL SUBTRACTION

(71) Applicant: Eden Rock Communications, LLC, Bothell, WA (US)

(72) Inventors: Chaz Immendorf, Bothell, WA (US); Rekha Menon, Bothell, WA (US); Eamonn Gormley, Bothell, WA (US)

(73) Assignee: SPECTRUM EFFECT, INC., Seattle, WA (US)

( * ) Notice: Subject to any disclaimer, the term of this patent is extended or adjusted under 35 U.S.C. 154(b) by 538 days.

(21) Appl. No.: 14/022,675

(22) Filed: Sep. 10, 2013

(65) Prior Publication Data

US 2014/0335879 A1 Nov. 13, 2014

Related U.S. Application Data

(60) Provisional application No. 61/820,660, filed on May 7, 2013.

(51) Int. Cl.
 *H04W 72/00* (2009.01)
 *H04W 72/08* (2009.01)
 *H04J 11/00* (2006.01)

(52) U.S. Cl.
 CPC ......... *H04W 72/082* (2013.01); *H04J 11/004* (2013.01); *H04J 11/0059* (2013.01)

(58) Field of Classification Search
 CPC .. H04J 11/0059; H04J 11/004; H04W 72/082; H04W 64/00
 USPC ....................................... 455/452.1; 370/336
 See application file for complete search history.

(56) References Cited

U.S. PATENT DOCUMENTS

| 2008/0025264 | A1  | 1/2008 | Willenegger et al. |
| 2010/0080323 | A1* | 4/2010 | Mueck ............... H04J 11/0033 375/296 |
| 2013/0053077 | A1* | 2/2013 | Barbieri ............. H04B 7/0626 455/509 |

FOREIGN PATENT DOCUMENTS

| WO | WO 2009/132143 A1 | 10/2009 |
| WO | WO 2011/105726 A2 | 9/2011 |

OTHER PUBLICATIONS

International Search Report and Written Opinion for PCT/US2013/067691, filed Oct. 31, 2013.

* cited by examiner

*Primary Examiner* — Nathan Mitchell
*Assistant Examiner* — Sayed T Zewari

(57) ABSTRACT

Interference may be detected in a cellular network by receiving signals at a target base station in a quiet resource block in which no uplink transmissions to the target base station are scheduled to occur, identifying a plurality of user equipment attached to base stations neighboring a target base station as interfering user equipment, reconstructing signals transmitted by the interfering user equipment, removing the reconstructed signals from the signals received by the target base station in the quiet resource block, and determining interference in the signals from which the reconstructed signals are removed. Detected interference data can be used to create an interference cancelling receiver.

22 Claims, 5 Drawing Sheets

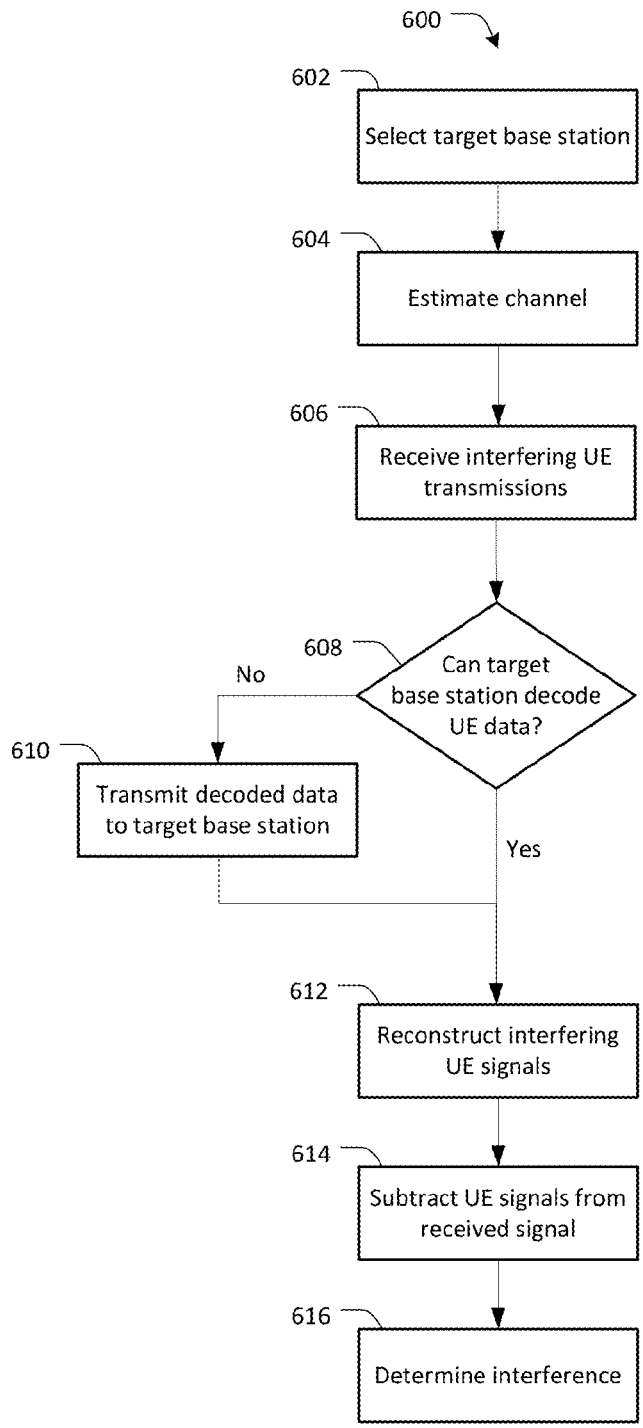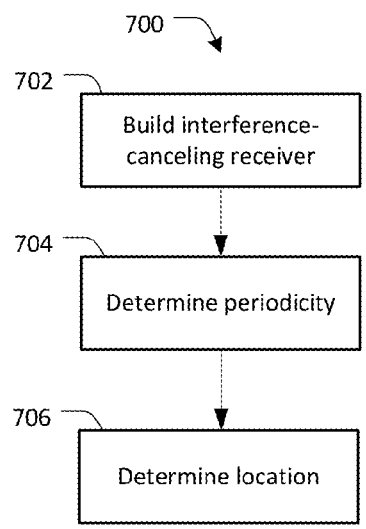
Fig. 6
Fig. 7

INTERFERENCE DETECTION WITH UE SIGNAL SUBTRACTION

CROSS-REFERENCES TO RELATED APPLICATIONS

The present invention claims priority to U.S. Provisional Application No. 61/820,660, filed May 7, 2013, which is incorporated by reference herein for all purposes.

BACKGROUND OF THE INVENTION

Wireless network operators pay large amounts of money to license wireless spectrum for their networks. They therefore carefully locate base stations and configure radio parameters to maximize the usage efficiency of the available spectrum. However, on many occasions, unlicensed users operate devices that cause interference to the licensed wireless equipment. The interference can degrade the performance of the licensed equipment, resulting in poor quality voice calls, dropped calls, a reduction in throughput in data networks, etc.

It may not be readily apparent that the deterioration in service is caused by external interference. Identifying a source of external interference may require prolonged trouble-shooting by the network operators. Hence, a dynamic way of identifying external interference is desirable. The ability to locate the interference source can further help to neutralize or shut down the interference source. When the cellular network is not the primary user of a spectrum allocation, a method to detect interference from the primary users is desirable.

BRIEF SUMMARY OF THE INVENTION

The present invention provides a method and system for identifying interference in a cellular network. In an embodiment, a target base station receives a signal during a quiet resource block in the target base station's uplink transmission schedule. A data component of the received signal is removed from the received signal, and interference is determined by analyzing the remaining signal.

In an embodiment, identifying interference in a cellular network includes receiving signals at the target base station in a quiet resource block in which no uplink transmissions to the target base station are scheduled to occur, identifying a plurality of user equipment attached to base stations neighboring a target base station as interfering user equipment, reconstructing signals transmitted by the interfering user equipment, removing the reconstructed signals from the signals received by the target base station in the quiet resource block, and determining interference in the signals from which the reconstructed signals are removed.

Identifying the plurality of user equipment as interfering user equipment may include receiving reference signals from the user equipment at the target base station. Reconstructing signals transmitted by the interfering user equipment may include generating channel estimates for channels between each of the interfering user equipment and the target base station, decoding data transmitted by the interfering user equipment, and using the channel estimates and the decoded data to reconstruct the signals. Determining interference may further include comparing the signals from which the reconstructed signals are removed to a noise level.

In an embodiment, reconstructing the signals transmitted by the interfering user equipment includes receiving a signal from an interfering user equipment at the target base station, attempting to decode the signal received from interfering user equipment at the target base station, determining whether the attempt to decode the signal was successful, and when the attempt to decode the signal is determined to be unsuccessful, transmitting decoded data of the signal from the interfering user equipment to the target base station.

In an embodiment, reconstructing the signals transmitted by the interfering user equipment includes decoding data corresponding to the signals transmitted by the interfering user equipment and transmitting the decoded data to the target base station.

In an embodiment, removing the reconstructed signals includes summing the reconstructed signals, and subtracting the summed reconstructed signals from the signals received by the target base station in the quiet resource block. In particular, removing the reconstructed signals may be performed according to the following equation:

$$\bar{r}(k) = r(k) - \Sigma_{j \in J} \hat{h}_j(k) s_j(k) = h_i(k) x(k) + n(k) + e(k),$$

in which $h_j(k)$ is the channel from the $j^{th}$ UE in set J to the target base station, $s_j(k)$ is the data transmitted from the $j^{th}$ UE in set J in the $k^{th}$ resource element, $h_i(k)$ is the channel from the interferer to the target base station, $x(k)$ is the signal from the interferer in the $k^{th}$ resource element, $n(k)$ is the noise in the $k^{th}$ resource element, $r(k)$ is the signals received by the target base station in the quiet resource block, and $\bar{r}(k)$ is the interference.

In an embodiment, an interference cancelling receiver may be created based on the detected interference. Creating the interference cancelling receiver may include calculating a cross-correlation matrix from detected interference samples. Interference may be identified for a plurality of target base stations in the network. A location of an interference source may be determined using levels of interference identified for the plurality of target base stations.

BRIEF DESCRIPTION OF THE DRAWINGS

FIG. 6 illustrates interference in a cellular network.

FIG. 7 illustrates characterizing interference according to an embodiment.

DETAILED DESCRIPTION OF THE INVENTION

Figure 1:
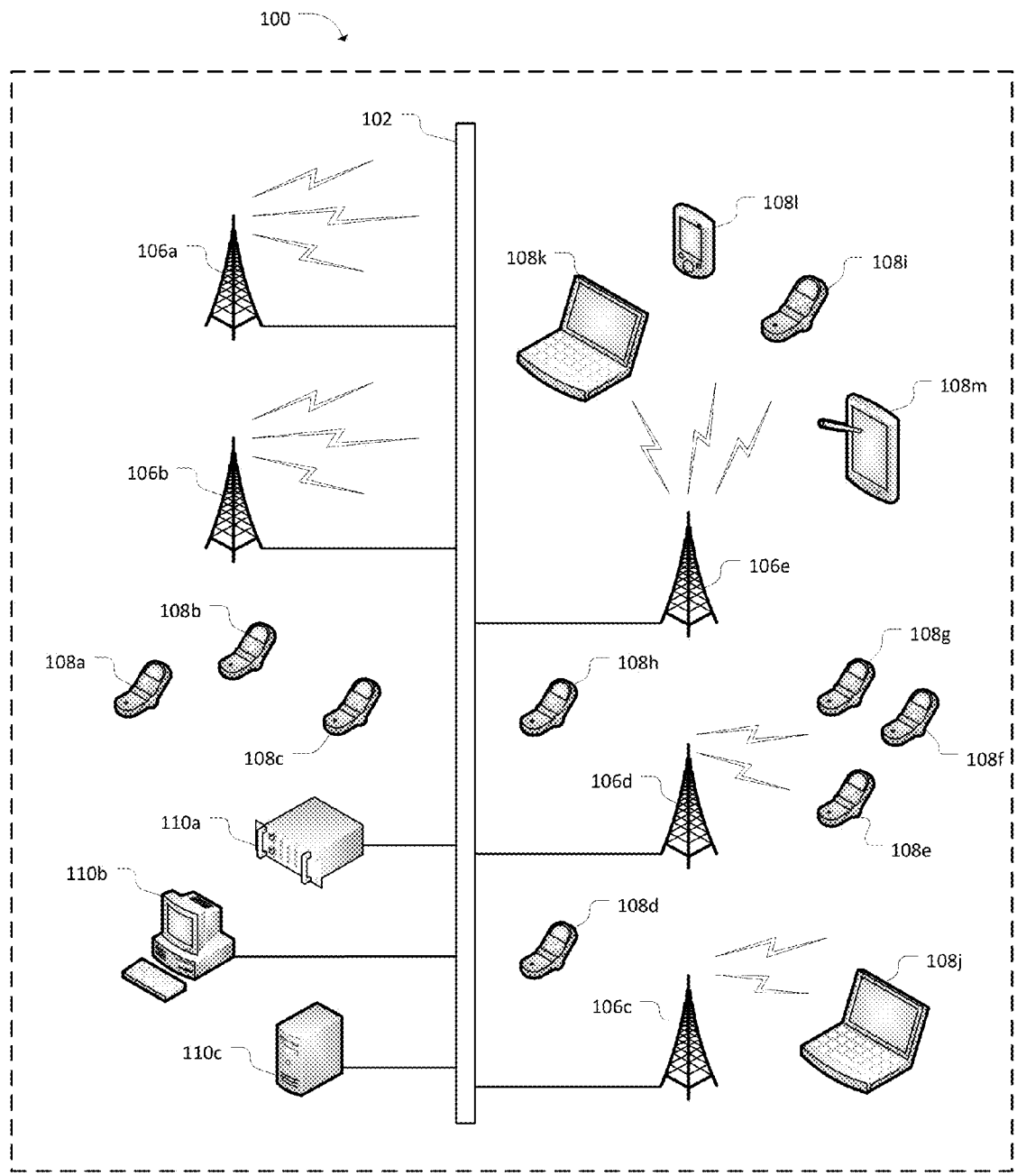
FIG. 1 illustrates a system according to an embodiment.

In the following detailed description, reference is made to the accompanying drawings, which form a part of the description. The example embodiments described in the detailed description, drawings, and claims are not meant to be limiting. Other embodiments may be utilized, and other changes may be made, without departing from the spirit or scope of the subject matter presented herein. It will be understood that the aspects of the present disclosure, as generally described herein and illustrated in the drawings, may be arranged, substituted, combined, separated, and designed in a wide variety of different configurations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of embodiments is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 illustrates an example networked computing system 100 according to an embodiment of this disclosure. As depicted, system 100 includes a data communications network 102, one or more base stations 106a-e, one or more base station antennas 104a-e, one or more network resource controller 110a-c, and one or more User Equipment (UE) 108a-m. As used herein, the term "base station" refers to a wireless communications station provided in a location and serves as a hub of a wireless network. The base stations include macrocells, microcells, picocells, and femtocells.

In a system 100 according to an embodiment of the present invention, the data communications network 102 may include a backhaul portion that can facilitate distributed network communications between any of the network controller devices 110 a-c and any of the base stations 106a-e. Any of the network controller devices 110a-c may be a dedicated Network Resource Controller (NRC) that is provided remotely from the base stations or provided at the base station. Any of the network controller devices 110a-c may be a non-dedicated device that provides NRC functionality among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations 106a-e.

As would be understood by those skilled in the Art, in most digital communications networks, the backhaul portion of a data communications network 102 may include intermediate links between a backbone of the network which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In an embodiment, an NRC has presence and functionality that may be defined by the processes it is capable of carrying out. Accordingly, the conceptual entity that is the NRC may be generally defined by its role in performing processes associated with embodiments of the present disclosure. Therefore, depending on the particular embodiment, the NRC entity may be considered to be either a hardware component, and/or a software component that is stored in computer readable media such as volatile or non-volatile memories of one or more communicating device(s) within the networked computing system 100.

In an embodiment, any of the network controller devices 110a-c and/or base stations 106a-e may function independently or collaboratively to implement processes associated with various embodiments of the present disclosure. Further, processes for detecting interference may be carried out via any common communications technology known in the Art, such as those associated with modern Global Systems for Mobile (GSM), Universal Mobile Telecommunications System (UMTS), Long Term Evolution (LTE) network infrastructures, etc.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In an embodiment, any of the network controller devices 110a-c, the base stations 106a-e, as well as any of the UE 108a-m may be configured to run any well-known operating system, including, but not limited to: Microsoft® Windows®, Mac OS®, Google® Chrome®, Linux®, Unix®, or any mobile operating system, including Symbian®, Palm®, Windows Mobile®, Google® Android®, Mobile Linux®, etc. Any of the network controller devices 110a-c, or any of the base stations 106a-e may employ any number of common server, desktop, laptop, and personal computing devices.

In an embodiment, any of the UE 108a-m may be associated with any combination of common mobile computing devices (e.g., laptop computers, tablet computers, cellular phones, handheld gaming units, electronic book devices, personal music players, MiFi™ devices, video recorders, etc.), having wireless communications capabilities employing any common wireless data communications technology, including, but not limited to: GSM, UMTS, 3GPP LTE, LTE Advanced, WiMAX, etc.

In an embodiment, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments of the invention, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
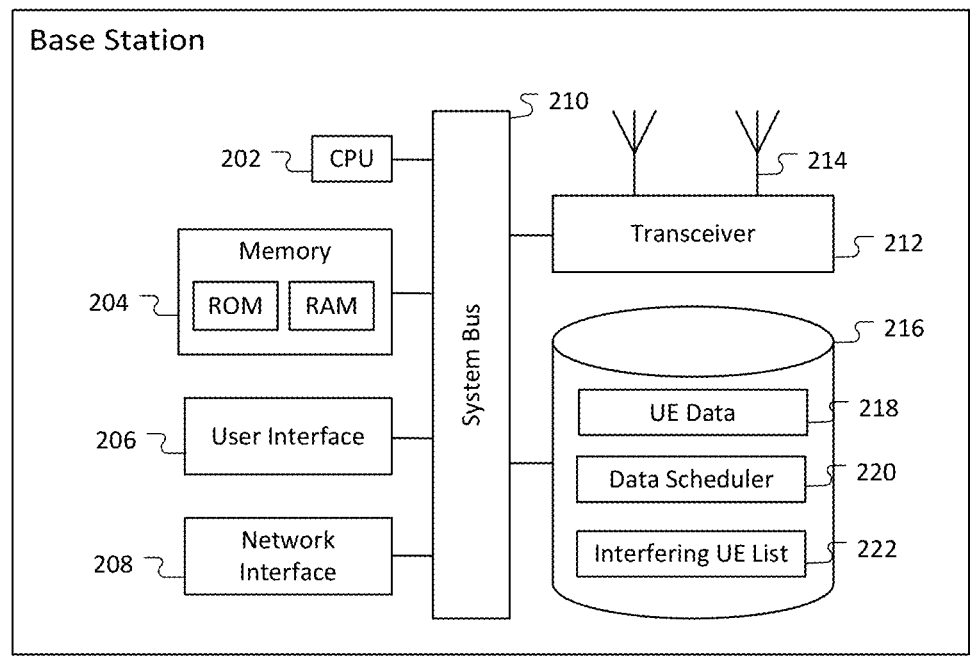
FIG. 2 illustrates a base station according to an embodiment.

FIG. 2 illustrates a block diagram of a base station 200 (e.g., a femtocell, picocell, microcell or macrocell) that may represent the base stations 106a-e in FIG. 1. In an embodiment, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and nonvolatile (ROM) system memories 204.

Base station 200 may include a user interface 206 for inputting and retrieving data to and from the base station by operator personnel, and a network interface coupled to a wireline portion of the network. In an embodiment, the base station 200 may send and receive scheduling information to and from an NRC, transmit signal data to an NRC, and share UE data with other base stations through network interface 208. Meanwhile, base station 200 wirelessly sends and receives information to and from UE through transceiver 212, which is equipped with one or more antenna 214.

The base station 200 may further include a system bus 210 and data storage 216. The system bus 210 facilitates communication between the various components of the base station 200. For example, system bus 210 may facilitate communication between a program stored in data device 216 and CPU 202 which executes the program. In an embodiment, data storage 216 may store UE data 218, a data scheduler 220 and an associated schedule, and at list of interfering UE 222. In addition, data storage 216 may include an operating system, and various programs related to the operation of the base station 200.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, etc.). Additionally, the base station 200 may be configured to communicate with UEs 108a-m via any Cellular Data Communications Protocol, including any common GSM, UMTS, WiMAX or LTE protocol.

Figure 3:
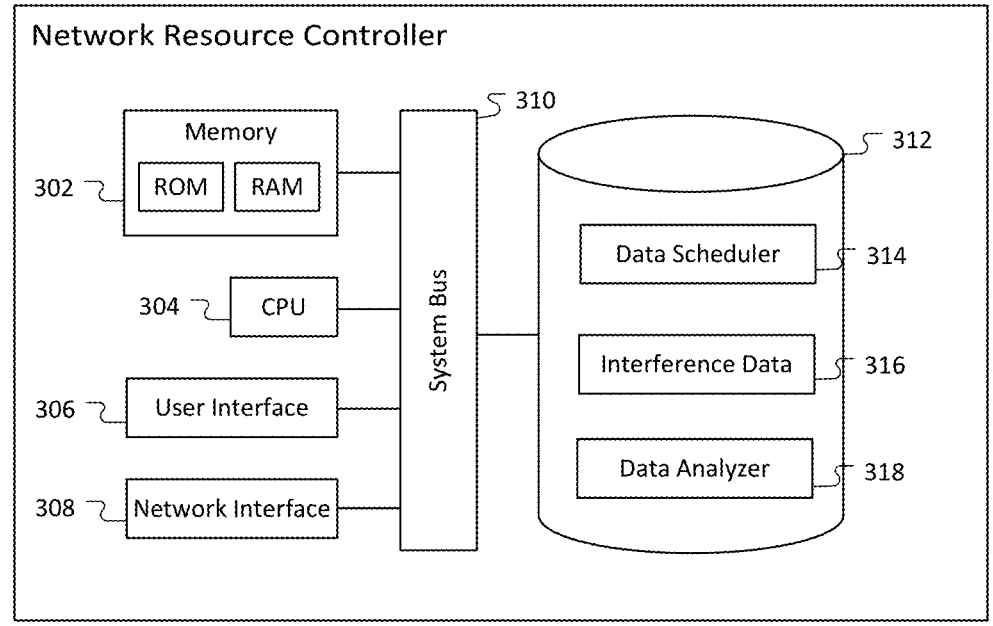
FIG. 3 illustrates a network resource controller according to an embodiment.

FIG. 3 illustrates a block diagram of an NRC 300 that may represent any of the network controller devices 110a-c. In an embodiment, one or more of the network controller devices 110a-c are SON controllers. The NRC 300 includes one or more processor devices including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The CPU 304 is responsible for executing computer programs stored on volatile (RAM) and nonvolatile (ROM) memories 302 and a storage device 312 (e.g., HDD or SSD).

In some embodiments, storage device 312 may store program instructions as logic hardware such as an application specific integrated circuit (ASIC) or field programmable gate array (FPGA). Storage device 312 may include a data scheduler 314, interference data 316, and data analyzer 318.

In an embodiment, data scheduler 314 controls the uplink and downlink transmissions in the cellular network. Various embodiments may have a data scheduler 314 in an NRC 300 as an alternative or in addition to the data scheduler 220 that may be included in base station 200. A radio resource manager (RRM), which may be embodied as an NRC 300, informs each of the data schedulers 220 and/or 314 in the network of the frequency and time resources on which they can transmit and receive data. The RRM is usually located at a centralized location in the network, where it can communicate to all the data schedulers in the network. Interference data 316 may include interference information such as the results of multiple interference determinations, a known interference profile for comparing with measured interference, etc. Data analyzer 318 may include program information for executing one or more form of data analysis described below, such as triangulation to identify a location of a source of interference.

The NRC 300 may also include a user interface 306 that allows an administrator to interact with the NRC's software and hardware resources and to display the performance and operation of the networked computing system 100. In addition, the NRC 300 may include a network interface 306 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, or the like. Based on the functionality provided by an NRC, the storage device of such a computer serves as a repository for software and database thereto.

Figure 4:
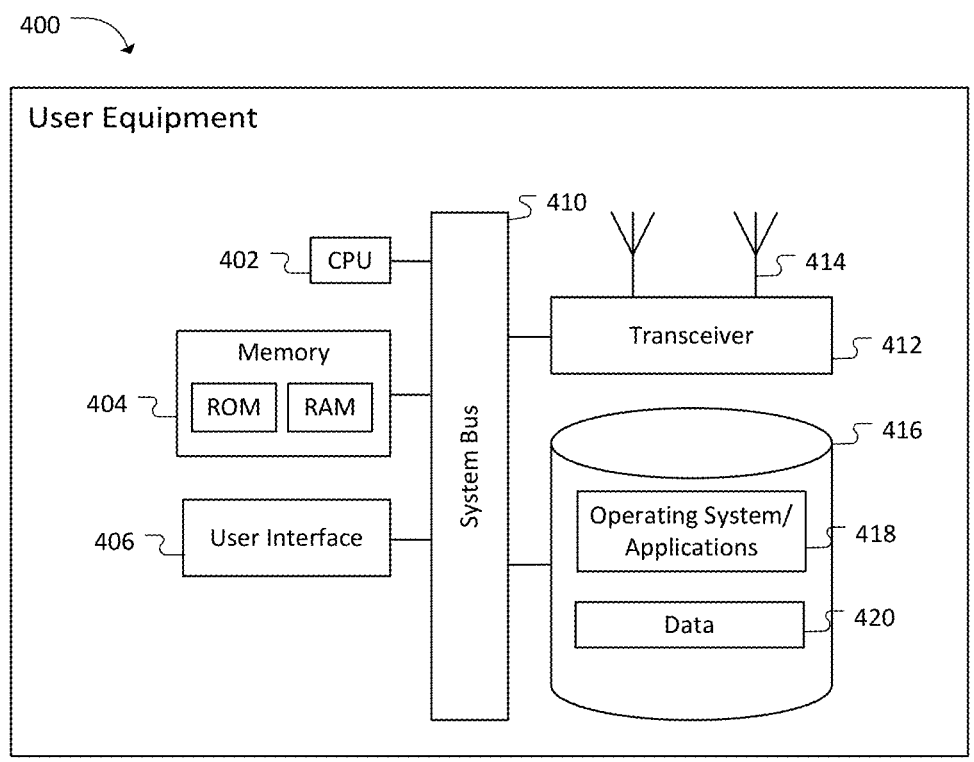
FIG. 4 illustrates user equipment according to an embodiment.

FIG. 4 illustrates a block diagram of user equipment 400 that may represent any of UEs 108 shown in FIG. 1. User equipment 400 may include a CPU 402, a memory 404, a user interface 406, a transceiver 412 including antenna 414, and storage device 416. Each of the components may communicate with one another through system bus 410. Storage device 416 may include operating system and applications 418 as well as data 420, which is data that is transmitted wirelessly through transceiver 412.

A system and method according to the present invention may be embodied on a cellular network which includes a plurality of wireless base stations communicating with UE over wireless links. UE data is transmitted to the base stations according to a schedule of resource blocks (RBs). As used herein, a RB represents a set of time and frequency resource elements. For example in an LTE system, a RB with a normal cyclic prefix spans 0.5 ms in the time domain and 180 KHz in the frequency domain and contains 84 resource elements.

Uplink transmissions are not scheduled over all RBs at all times during the normal course of operation of a base station. RBs in which no transmissions occur may be referred to as quiet RBs. A quiet RB is a potential candidate for detecting interference at the corresponding base station. If a base station receives signals in a quiet RB, the signals received by the base station should include noise and external interference, if external interference is present.

Neighboring base stations can schedule transmissions in the quiet RBs in a target base station's schedule. A target base station is a base station which measures signals for interference detection, and neighboring base stations are base stations that serve wireless equipment whose signals interfere with communications of the target base station. When transmissions occur at base stations neighboring the target base station, the neighboring transmissions may obscure external interference. Such transmissions are referred to herein as system interference, which is distinct from external interference. External interference is interference from a source other than base station to user equipment wireless communications or user equipment to base station wireless communications.

Figure 5:
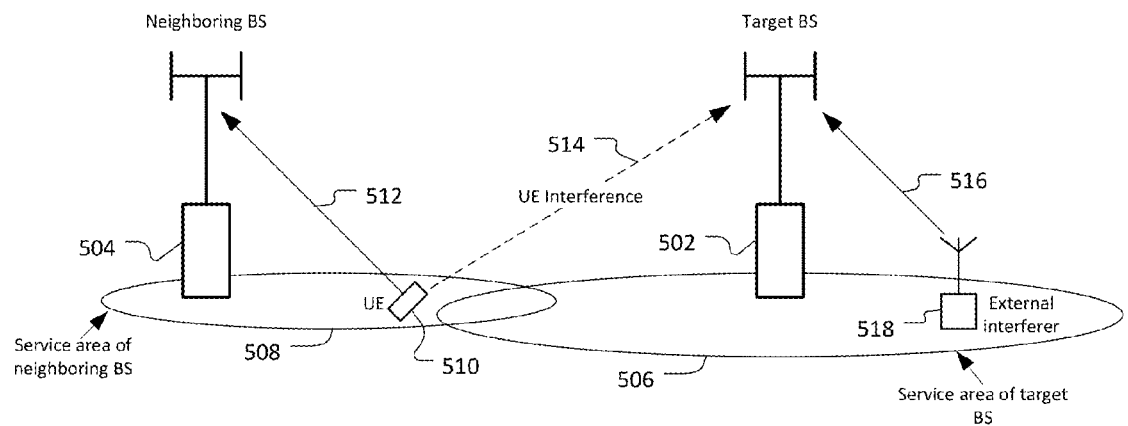
FIG. 5 illustrates an uplink transmission matrix according to an embodiment.

An example is shown in FIG. 5. FIG. 5 shows a target base station 502 with a coverage area 506 and a neighboring base station 504 with a coverage area 508. UE 510 is attached to neighboring base station 504, and uplink transmission 512 is received by neighboring base station 506 as a normal transmission. Meanwhile, the same uplink transmission is received by target base station 502 as system interference 514. Target base station 502 also receives external interference 516 from an external interference source 518.

In the example of FIG. 5, target base station 502 would like to use empty RBs to detect and estimate external interference 516. However, significant power is received as interference 514 from the uplink transmission of a UE 510 coupled to neighboring base station 504. Hence, even when there are no uplink transmissions in the service area 506 of the target base station 502, uplink transmissions received from UE 510 attached to a neighboring base station may be detected as interference.

Embodiments of the present invention address challenges presented by the scenario of FIG. 5 by removing transmissions of interfering UE from signals received by the target base station in a quiet RB of the target base station. The quiet RB of the target base station in which interfering UE signals are received may be referred to as a target RB. System interference may be subtracted using decoded data from interfering neighbor UEs. Once the system interference is subtracted, remaining data from the RB on which the target base station has not scheduled any transmissions can be used to detect and estimate external interference.

A signal received by a target base station with k resource elements on the $k^{th}$ resource element of a quiet RB of the target base station can be expressed according to the following Equation 1:

$$r(k) = \sum_{j \in J} h_j(k)s_j(k) + h_i(k)x(k) + n(k) \quad \text{[Equation 1]}$$

In Equation 1, J is the set of interfering UEs associated with neighboring base stations that transmit in the same RB, $h_j(k)$ is the channel from the $j^{th}$ UE in set J to the target base station, $s_j(k)$ is the data transmitted from the $j^{th}$ UE in set J in the $k^{th}$ resource element, $h_i(k)$ is the channel from the interferer to the target base station, $x(k)$ is the signal from the interferer in the $k^{th}$ resource element and $n(k)$ is the noise in the $k^{th}$ resource element.

In an embodiment in which the base station has M receiving antennas, $r(k)$, $h_j(k)$, $h_i(k)$ and $n(k)$ may be vectors of length M.

As seen in FIG. 6, process 600 of determining interference includes step 602 of identifying a target base station. As discussed above, interfering signals are measured by a target base station. Accordingly, a target base station is selected. In an embodiment, each base station in a network may be selected. In another embodiment, one or more base station in a network is selected. For example, when performance metrics suggest that one or more base station may be receiving detrimental levels of interference, each of the one or more base stations may be selected as target base stations.

In step 604, interfering UE which cause system interference at the target base station, such as UE 510 of FIG. 5, are identified. In an embodiment, the target base station receives reference signals, such as demodulation reference signals, from the UE attached to neighboring base stations. The target base station can use the reference signals to estimate uplink channels from the interfering UE. If a reference signal from a UE is detected by the target base station, that UE may be identified as an interfering UE.

Channel power estimates are then used to determine UE transmissions that cause significant interference at the target base station. In an embodiment, a channel power estimate may be a second order norm function of the channel estimates given by $\|\hat{h}_j\|_2$.

Step 604 may include comparing channel estimates to a threshold value, and only identifying UE whose channel power estimate exceeds the threshold value as interfering UE. The set of UE which a target base station has identified as interfering UE may be referred to as an interfering UE list for the target base station.

In step 606, the target base station receives signals from interfering UE in a quiet resource block in the target base station's uplink schedule.

In step 608 the target base station determines whether it can successfully decode the signals received from the interfering UE. In an embodiment, this determination is made by attempting to decode the signal received from the interfering UE at the target base station. The target base station can then determine whether the decoding attempt was successful by performing an error detection test such as a cyclic redundancy check (CRC). Persons of skill in the art will recognize that other embodiments may use other tests for determining whether decoding was successful.

When the error check is successful, then the result of the determination is that the base station can successfully decode the data. In contrast, when the error detection test fails, the target base station determines that its decoding was unsuccessful and requests decoded information from the network in step 610. In an embodiment, the UE data is decoded at the base station to which it is attached and transmitted through the network to the target base station.

In process 612, the signals received by the target base station from interfering UE are reconstructed. The signals may be reconstructed using the channel estimate and the decoded UE data. In an embodiment, reconstructing the interfering UE signals is performed by the target base station.

Once the signals received from all the interfering UEs are reconstructed, in step 614 a sum of the signals is subtracted from the signal received in the target RB. The remaining signal in the $k^{th}$ resource element of the target RB is now given by the following Equation 2, in which $\hat{h}_j$ is a channel estimate:

$$\bar{r}(k) = r(k) - \sum_{j \in J} \hat{h}_j(k)s_j(k) = h_i(k)x(k) + n(k) + e(k) \quad \text{[Equation 2]}$$

Assuming that the UE data has been decoded correctly and the error due to channel estimation (e(k)) is small, the remaining signal in the quiet RB primarily corresponds to the signal received from the external interference and noise. The signal strength of the remaining signal can now be compared to a threshold value to determine the presence of an interferer in step 616. In some embodiments, the baseband interference samples can be used to characterize the interference. Example characterization operations include calculating the periodicity, moments, and cyclo-stationary characteristics. In an embodiment, these characteristics can be used to fingerprint and identify the interference source. In another embodiment, information extracted from the baseband samples (such as time of arrival and signal strength) can also be used to localize or locate the interference source.

A process 700 of characterizing interference is shown in FIG. 7. Once the reconstructed signals from interfering UE transmissions are subtracted, the signal in the target RB, which may be referred to as the subtracted signal, includes external interference and noise power. Although process 700 is shown with a sequential order, no actual sequence is implied. Steps 702, 704, and 706 may be performed in any order, and embodiments may perform all, none, or a portion of the steps.

In step 702, an interference cancelling receiver is built for a target base station. In an embodiment, the subtracted signal measurements may be used to construct an estimate of the cross-correlation matrix of the interference. This is illustrated below using an example in which the external-interferer's periodicity matches that of a resource element.

In the example, the expectation of the cross-correlation matrix of the subtracted signal at the target base station, assuming that the channel estimation error e(k) is small, is given by the following Equation 3:

$$E[\bar{r}(k)\bar{r}(k)^T] = E[(h_i(k)x(k)+n(k))(h_i(k)x(k)+n(k))^T] \quad \text{[Equation 3]}$$

In Equation 3, T is the conjugate transpose operation on a matrix or vector. In an embodiment, the expectation operation can be performed by averaging the cross correlation matrix of the subtracted signal over multiple RBs. Noise and interference are generated by independent sources and can be considered to be independent signals. Then, $$E[\bar{r}(k)\bar{r}(k)^T] = E[(h_i(k)x(k))(h_i(k)x(k))^T] + E[h_i(k)x(k))]$$
$$E[n(k)^T] + E[n(k)]E[(h_i(k)x(k))^T] + \sigma^2 \quad \text{[Equation 4]}$$

Assuming zero mean noise, $$E[\bar{r}(k)\bar{r}(k)^T] = E[h_i(k)h_i(k)^T]E[x(k)^2] + \sigma^2 = R_{xx} + I^2 \quad \text{[Equation 5]}$$

In Equation 5, $R_{xx}$ is the interference cross-correlation matrix, I is an M×M unity matrix and $\sigma^2$ is the noise variance.

It is thus seen that if the interference power is constant across the averaging period, an estimate of the external interference cross-correlation matrix can be formed by averaging the cross-correlation matrix of the subtracted signal across multiple RBs. Persons of skill in the art will recognize that the estimate of the external interference cross-correlation matrix can then be used to build an external interference cancelling receiver for the RB. Cancelling interference enables the target base station to schedule regular data transmission on the RB.

In an embodiment in which the cross-correlation metrics are constructed by averaging over multiple RBs, the proposed method is most effective when the external-interference sources are stationary or near-stationary. Note that this process precludes the base station from requiring information about the RF channel from the external interferer directly to build the external interference cancelling receiver.

In step 704, the periodicity of interference may be determined. In an embodiment, the periodicity of interference may be less than the duration of the target RB, or in a case in which multiple target RBs occur back-to-back, the periodicity may be apparent from the total measurement period. In another embodiment, multiple interference measurements taken over time may provide sufficient data to accurately estimate the periodicity.

In step 706, a location of the external interference may be determined. For example, when a plurality of target base stations are analyzed in a network, the network may have information about the strength of some sources of interference relative to location. Triangulation, trilateration, and other locating techniques may then be employed to determine a location, or source, of the external interference. Determining location 706 may yield more accurate results when the interference has regular characteristics such as a constant frequency and periodicity. In an embodiment, determining location may determine a geographical area in which a source of external interference is likely to be located.

Although aspects of certain processes are described as taking place using specific equipment in certain specific situations, persons of skill in the art will recognize that in other embodiments other processes may be performed using other equipment without departing from the scope and spirit of the present invention. For example, decoding UE data is described as taking place at base stations in some embodiments, but in other embodiments, some or part of the decoding process can take place on one or more NRC coupled to a portion of the network physically separate from the base stations. In other embodiments, operations may be distributed among a plurality of processing cores. Accordingly, the term "one or more computer readable media" encompasses embodiments in which processes may be performed by a single processing core at a single physical location, as well as embodiments in which the processes are performed by a plurality of processing cores at a plurality of physical locations based on instructions encoded on a corresponding plurality of computer readable media.

What is claimed is:

1. A method for identifying interference in a cellular network, the method comprising:
   receiving interfering signals at a target base station in a quiet resource block in which no uplink transmissions to the target base station are scheduled to occur;
   determining identities of each individual user equipment of a plurality of user equipment attached to base stations neighboring the target base station as interfering user equipment;
   reconstructing signals transmitted by the interfering user equipment;
   removing the reconstructed signals from the signals received by the target base station in the quiet resource block; and
   determining interference in the signals from which the reconstructed signals are removed.

2. The method of claim 1, wherein identifying the plurality of user equipment as interfering user equipment includes receiving reference signals from the user equipment at the target base station.

3. The method of claim 1, wherein reconstructing signals transmitted by the interfering user equipment includes generating channel estimates for channels between each of the interfering user equipment and the target base station, decoding data transmitted by the interfering user equipment, and using the channel estimates and the decoded data to reconstruct the signals.

4. The method of claim 1, wherein determining interference further includes comparing the signals from which the reconstructed signals are removed to a noise level.

5. The method of claim 1, wherein reconstructing the signals transmitted by the interfering user equipment comprises:
receiving a signal from an interfering user equipment at the target base station;
attempting to decode the signal received from interfering user equipment at the target base station;
determining whether the attempt to decode the signal was successful; and
when the attempt to decode the signal is determined to be unsuccessful, transmitting decoded data of the signal from the interfering user equipment to the target base station.

6. The method of claim 1, wherein reconstructing the signals transmitted by the interfering user equipment includes decoding data corresponding to the signals transmitted by the interfering user equipment and transmitting the decoded data to the target base station.

7. The method of claim 1, wherein removing the reconstructed signals includes summing the reconstructed signals, and
subtracting the summed reconstructed signals from the signals received by the target base station in the quiet resource block.

8. The method of claim 7, wherein removing the reconstructed signals is performed according to the following equation:

$$\bar{r}(k)=r(k)-\Sigma_{j\in J}\hat{h}_j(k)s_j(k)=h_i(k)x(k)+n(k)+e(k),$$

in which $h_j(k)$ is the channel from the $j^{th}$ UE in set J to the target base station,
$s_j(k)$ is the data transmitted from the $j^{th}$ UE in set J in the $k^{th}$ resource element,
$h_i(k)$ is the channel from the interferer to the target base station,
$x(k)$ is the signal from the interferer in the $k^{th}$ resource element,
$n(k)$ is the noise in the $k^{th}$ resource element,
$r(k)$ is the signals received by the target base station in the quiet resource block, and
$\bar{r}(k)$ is the interference.

9. The method of claim 1, further comprising:
creating an interference cancelling receiver based on the detected interference.

10. The method of claim 9, wherein creating the interference cancelling receiver includes calculating a cross-correlation matrix from detected interference samples.

11. The method of claim 9, wherein interference is identified for a plurality of target base stations in the network.

12. The method of claim 11, further comprising:
determining a location of an interference source using levels of interference identified for the plurality of target base stations.

13. A system for detecting interference in a cellular network, the system comprising:
a plurality of base stations including a target base station;
a memory;
a processor; and
one or more non-transitory computer readable medium associated with the processor, the one or more computer readable medium having computer executable instructions stored thereon which, when executed by associated one or more processor, perform the following steps:
determining identities of each individual user equipment of a plurality of user equipment attached to base stations neighboring the target base station as interfering user equipment;
receiving interfering signals at the target base station in a quiet resource block in which no uplink transmissions to the target base station are scheduled to occur;
reconstructing signals transmitted by the interfering user equipment;
removing the reconstructed signals from the signals received by the target base station in the quiet resource block; and
determining interference in the signals from which the reconstructed signals are removed.

14. The system of claim 13, wherein identifying the plurality of user equipment as interfering user equipment includes receiving reference signals from the user equipment at the target base station.

15. The system of claim 13, wherein reconstructing signals transmitted by the interfering user equipment includes generating channel estimates for channels between each of the interfering user equipment and the target base station, decoding data transmitted by the interfering user equipment, and using the channel estimates and the decoded data to reconstruct the signals.

16. The system of claim 13, wherein reconstructing the signals transmitted by the interfering user equipment includes decoding data corresponding to the signals transmitted by the interfering user equipment and transmitting the decoded data to the target base station.

17. The system of claim 13, wherein determining interference further includes comparing the signals from which the reconstructed signals are removed to a noise level.

18. The system of claim 13 wherein removing the reconstructed signals includes summing the reconstructed signals, and
subtracting the summed reconstructed signals from the signals received by the target base station in the quiet resource block.

19. The system of claim 18, wherein removing the reconstructed signals is performed according to the following equation:

$$\bar{r}(k)=r(k)-\Sigma_{j\in J}\hat{h}_j(k)s_j(k)=h_i(k)x(k)+n(k)+e(k),$$

in which $h_j(k)$ is the channel from the $j^{th}$ UE in set J to the target base station,
$s_j(k)$ is the data transmitted from the $j^{th}$ UE in set J in the $k^{th}$ resource element,
$h_i(k)$ is the channel from the interferer to the target base station,
$x(k)$ is the signal from the interferer in the $k^{th}$ resource element,
$n(k)$ is the noise in the $k^{th}$ resource element,
$r(k)$ is the signals received by the target base station in the quiet resource block, and
$\bar{r}(k)$ is the interference.

20. The system of claim 13, wherein an interference cancelling receiver is created by calculating a cross-correlation matrix from detected interference samples.

21. The system of claim 20, wherein the one or more non-transitory computer readable medium includes a first computer readable medium disposed at the target base station and a second computer readable medium disposed at a base station from among the base stations neighboring the target base station, and
wherein the processor includes a first processing core disposed at the target base station and a second processing core disposed at a base station from among the base stations neighboring the target base station.

22. The system of claim 13, wherein interference is identified for a plurality of target base stations in the network.

* * * * *